United States Patent [19]

Schmitt et al.

[11] Patent Number: 4,695,063
[45] Date of Patent: Sep. 22, 1987

[54] RADIAL SHAFT SEAL RING WITH BACKFEED RIBS AND DAMMING RIBS

[75] Inventors: Wolfgang Schmitt, Viernheim; Hans Forch, Birkenau, both of Fed. Rep. of Germany

[73] Assignee: Firma Carl Freudenberg, Weinheim/Bergstr, Fed. Rep. of Germany

[21] Appl. No.: 796,003

[22] Filed: Nov. 7, 1985

[30] Foreign Application Priority Data

Nov. 8, 1984 [DE] Fed. Rep. of Germany ....... 3440797

[51] Int. Cl.$^4$ .............................................. F16J 15/32
[52] U.S. Cl. ..................................... 277/134; 277/152; 277/208
[58] Field of Search ................................ 277/133–135, 277/152, 153, 165, 207 R, 208

[56] References Cited

U.S. PATENT DOCUMENTS

| | | | |
|---|---|---|---|
| 2,446,380 | 8/1948 | Meyers et al. | 277/134 X |
| 3,482,845 | 12/1969 | Bertrandi et al. | 277/134 |
| 3,729,204 | 4/1973 | Augustin | 277/134 |
| 3,913,925 | 10/1975 | Gyory | 277/134 X |
| 4,427,205 | 1/1984 | Holzer et al. | 277/152 X |

FOREIGN PATENT DOCUMENTS

| | | | |
|---|---|---|---|
| 1916214 | 10/1969 | Fed. Rep. of Germany | 277/134 |
| 56-150657 | 11/1981 | Japan | 277/134 |

Primary Examiner—Robert S. Ward
Attorney, Agent, or Firm—Felfe & Lynch

[57] ABSTRACT

A seal ring has an annular sealing lip of a polymeric material which bears resiliently about a shaft rotatable relative thereto with a sealing strip and hydrodynamically acting backfeed ribs to one side of the sealing strip. An annular projection projects from the other side of the sealing strip with a radial clearance between a cylindrical or conical interior surface of the annular projection and the shaft. The annular projection is united with the sealing strip in a bending-resistant manner. Damming ribs protrude uniformally about the interior surface of the annular projection. Each damming rib has a leading surface which makes an obtuse angle with the interior surface and is parallel to the axis thereof.

6 Claims, 3 Drawing Figures

RADIAL SHAFT SEAL RING WITH BACKFEED RIBS AND DAMMING RIBS

BACKGROUND OF THE INVENTION

The invention relates to a seal ring for sealing radially about a shaft and, more particularly, one having an annular sealing lip of a polymeric material one side of which bears resiliently on the shaft with a sealing strip, hydrodynamically-acting backfeed ribs on one side of the sealing strip, an internally cylindrical or conical annular projection on the other side of the sealing strip having and a radial clearance between its cylindrical or conical interior surface and the shaft, the annular projection being united with the sealing strip in a bending-resistant manner, and damming ribs uniformly distributed about and protruding from the interior surface of the annular projection.

A seal ring generally of this type is disclosed in U.S. Pat. No. 3,913,925. It has helical, i.e. hydrodynamically-acting backfeed ribs which make an acute angle with the axis of rotation of the sealed shaft. With the shaft rotating, sealed medium is, therefore, axially returned in the direction of the sealed space. However, before it can leave the seal ring, it has to overcome an end-most sealing strip which, like the helical ribs, bears on the surface of the sealed shaft when the latter is not rotating. The process thus entails lifting both the helical ribs and the sealing strip from the surface of the sealed shaft which achieves wear-free sealing under normal conditions, that is, with the shaft rotating. However, this makes it necessary for the gaps between the helical ribs to be connected with the space containing the sealed medium through bores. Making such bores is technically onerous. It adds to the cost of such seal rings.

SUMMARY OF THE INVENTION

The object of the invention is to provide a seal ring which is distinguished by mimimal wear and effective sealing action whether the shaft is rotating or not, and which can be manufactured at much lower cost than the design described above.

In accordance with the invention, this object is accomplished with a seal ring having an annular, polymeric sealing lip for bearing on one side resiliently about a shaft with a sealing strip. Hydrodynamically-acting backfeed ribs are on the one side of the sealing lip to one side of the sealing strip. An annular projection having a cylindrical or conical interior surface, i.e. the surface on the same side of the sealing lip as the hydrodynamically-acting backfeed ribs and sealing strip, projects from the other side of the sealing strip with a radial clearance from the shaft, i.e. recessed into the sealing lip relative to the sealing strip. Damming ribs are uniformly spaced about the interior surface of the annular projection, whereby they may cover the interior surface except at interstices between the damming ribs, and project therefrom, i.e. toward the shaft when the sealing strip bears thereon, which shaft they may, therefore, engage, too. Each damming rib therefore has a surface which projects from the cylindrical or conical interior surface of the annular projection and which, in use, when the seal ring and shaft relatively rotate, is the leading surface of the relative rotation of the seal ring and, therefore, so identified. The leading surface of each damming rib forms an obtuse angle with the cylindrical or conical interior surface of the annular projection and parallel to the axis thereof. That is, in use about the shaft, the leading surface of each damming rib, viewed endwise relative to of the shaft, makes an acute angle with the surface of the shaft and, viewed along or lengthwise of the shaft, is parallel to the axis thereof. The damming ribs of the seal ring of the invention thus have no undercuts of any kind and therefore can be formed with the greatest of ease.

The annular projection and the sealing strip must be united in a bending-resistant manner. This requirement is readily satisfied by making the cross section of their union appropriately large. The combined annular projection and sealing strip may optionally be joined to the rest of the seal ring and, thereby, a housing thereabout by a diaphragm-like, i.e. flexible, transition piece which enables them, to follow radial motion of the sealed shaft readily, even if they are relatively rigid.

The projection of the damming ribs from the cylindrical interior surface of the annular projection and, thus, the radial depth of the gaps between the damming ribs is relatively small, about 0.1 to 0.5 mm, the average projection and depth from a conical interior surface corresponding. The capillary forces of such small gaps are sufficient at all times, i.e. when the shaft is relatively rotating or stopped, to assure that these gaps are completely filled with a sealed medium such as lubricating oil, for example.

The medium such as lubricating oil in the gaps between the damming ribs when the shaft is not rotating adheres to the surface of the shaft sufficiently that, upon rotation of the shaft, it is forced against the leading surfaces of the damming ribs. The force of the medium against the leading surfaces of the damming ribs thus causes, initially, a decrease in the resilient bearing pressure of the sealing lip on the shaft and, ultimately, lifting the sealing lip therefrom, as desired for wear-free operation. The sealing action thereafter is based strictly on dynamic effects and, particularly, on the hydrodynamic backfeed of the hydrodynamically-acting backfeed ribs therefor. These backfeed ribs have no sealing function when the shaft is not rotating.

When the interior surface of the annular projection in which the leading surfaces of the damming ribs terminate is conical with diameters increasing away from the sealing strip, that is in the direction of the sealed medium, the damming ribs can be readily removed from a mold and are, therefore, easy to manufacture. When optimal rigidity is imparted to the union of the sealing strip and annular projection, such damming ribs further assure good utilization of the dynamic forces of the sealed medium when the shaft is rotating.

In another embodiment, each damming rib has a surface opposite the leading surface, in a mirror-image relationship, thereto to achieve direction-independent leading-surface effectiveness. A seal so designed will always be effective, regardless of the direction of rotation of the sealed shaft, and therefore can be used universally.

BRIEF DESCRIPTION OF THE DRAWING

Exemplary embodiments of the seal rings according to the invention are illustrated in the accompanying drawing, wherein.

DESCRIPTION OF THE EXEMPLARY EMBODIMENTS

Figure 1:
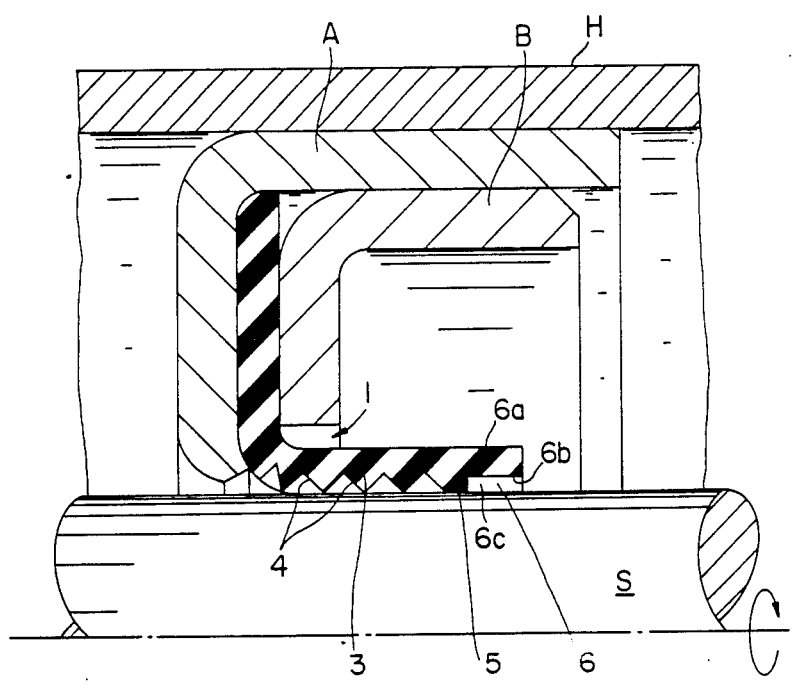
FIG. 1 is half an axial section of one exemplary embodiment.

The seal ring at 1 shown in FIG. 1 has an annular sealing lip 3 which is held in position resiliently bearing about a shaft S by two angular rings A and B which engage the seal ring and a housing H thereabout in a liquid-tight manner secured against twisting. For the resilient bearing, the sealing ring ends in the region of its inside diameter in the direction of the sealed medium (not shown) so that, when the shaft is not rotating one side of the sealing lip 3 bears over a considerable length on the surface of the shaft. A sealing strip 5 which is a continuous band about the one side of the sealing lip then effects static sealing. For this, the sealing strip is of angular configuration and contacts the surface of the shaft continuously with its continuous band. Hydrodynamically-acting backfeed ribs 4 are on one side of the sealing strip 5. An annular projection 6a is on the other side of the sealing strip.

Figure 2:
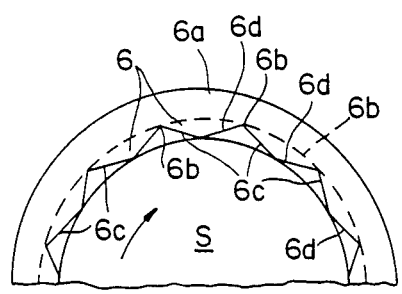
FIG. 2 is half an end elevation of the exemplary embodiment of FIG. 1.

The annular projection, which is on the side of the sealing strip 5 directed toward the sealed medium, has a cylindrical interior surface 6b with a larger inside diameter than the sealing strip and hydrodynamically-acting backfeed ribs to be radially spaced from the shaft. Damming ribs 6 project from the cylindical interior surface and, thus, in the direction of the shaft. As shown in FIG. 2, leading surfaces 6c of the damming ribs make an acute angle with the surface of the shaft and, thus, an obtuse angle with the cylindrical interior surface 6b which, as shown by dashed lines in FIG. 2, is substantially covered by the damming ribs 6 uniformly spaced thereabout, except at interstices between the damming ribs, and extend parallel to the axis thereof. Surfaces 6d in mirror image thereto provide an alternative leading surface for directional independence to the relative rotation extend parallel thereto.

Figure 3:
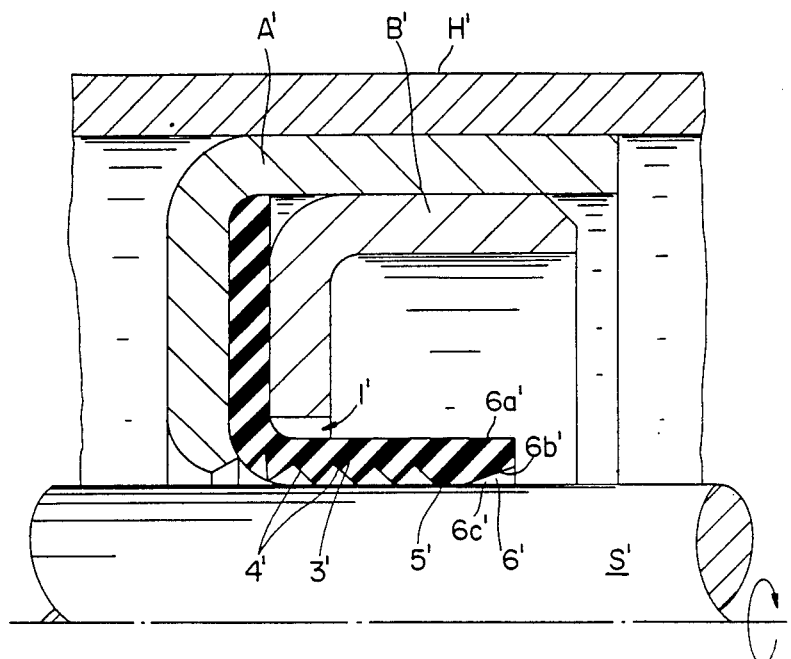
FIG. 3 is half an axial section of another exemplary embodiment.

Returning to FIG. 1, on the other side of the sealing strip 5, remote from the sealed medium, are the hydrodynamically-acting backfeed ribs 4. These are formed by three intercalated screw threads which, when the shaft is rotating, exert a hydrodynamic conveying action on leakage in the direction of the sealed space. The exemplary embodiment of FIG. 3 is the same as that of FIGS. 1 and 2, and its parts therefore correspondingly referenced, except for the interior surface 6b' of the annular projection 6a'. The interior surface 6b' is conical, instead of cylindrical, opening away from the sealing strip 5'.

It will be appreciated that the instant specification and claims are set forth by way of illustration and not of limitation, and that various changes and modifications may be made without departing from the spirit and scope of the present invention.

What is claimed is:

1. A radial shaft seal ring comprising an annular sealing lip of a polymeric material which by a peripheral sealing strip bears resiliently on the shaft, hydrodynamically acting backfeed ribs on the side of the sealing strip remote from the pressure, an internally cylindrical annular projection on the side facing the sealed medium, and a radial clearance between the interior of the annular projection and the shaft, the annular projection being united with the sealing strip in a bending-resistant manner, and damming ribs which have leading surfaces for the sealed medium and are uniformly distributed over the periphery protruding from the interior of the annular projection, characterized in that the leading surfaces, viewed at right angles to the axis of rotation of the shaft, make an acute angle with the shaft surface and extend parallel thereto.

2. A radial shaft seal ring according to claim 1, characterized in that there are associated with the leading surfaces on the back of the damming ribs, in a mirror-image relationship, further leading surfaces to achieve direction-independent effectiveness.

3. A seal ring, comprising:
    an annular, polymeric sealing lip having, on one side, a sealing strip for bearing resiliently about a shaft rotatable relative thereto and hydrodynamically-acting backfeed ribs to one side of the sealing strip;
    an annular projection from the other side of the sealing strip in a bending-resistant manner, the annular projection having one of a cylindrical and conical interior surface when the sealing lip is about the shaft, the interior surface being recessed into the sealing lip relative to the sealing strip, whereby the interior surface is radially spaced from the shaft; and
    damming ribs uniformly spaced about the interior surface and projecting therefrom, each damming rib having a first surface which projects from the interior surface, whereby it may be the leading surface of rotation of the sealing lip relative to the shaft in one direction, the first surface forming an obtuse angle to the interior surface and being parallel to the axis thereof.

4. The seal ring of claim 3, wherein the interior surface is conical with diameters increasing away from the sealing strip.

5. The seal ring of claim 3, and further comprising another surface on each damming rib in mirror image to the first surface, whereby to provide independence of the direction of relative rotation.

6. The seal ring of claim 4, and further comprising another surface on each damming rib in mirror image to the first surface, whereby to provide independence of the direction of relative rotation.

* * * * *